United States Patent

[11] 3,587,016

| [72] | Inventor | James L. Coakley |
| --- | --- | --- |
| | | Camarillo, Calif. |
| [21] | Appl. No. | 6,853 |
| [22] | Filed | Jan. 29, 1970 |
| [45] | Patented | June 22, 1971 |
| [73] | Assignee | Abex Corporation |
| | | New York, N.Y. |

[54] NULL ADJUSTER FOR MAGNETICALLY OPERATED TORQUE MOTORS
7 Claims, 4 Drawing Figs.

[52] U.S. Cl. ................................................. 335/237, 335/230, 310/36
[51] Int. Cl. .................................................... H01f 7/08
[50] Field of Search ............................................ 335/229, 230; 310/29, 36, 236, 237

[56] References Cited
UNITED STATES PATENTS

| 3,058,038 | 10/1962 | Stedmaxi, Jr. et al. | 335/237 X |
| --- | --- | --- | --- |
| 3,154,728 | 10/1964 | Bordenet | 335/236 X |
| 3,435,393 | 3/1969 | Meisel | 335/237 |
| 3,447,111 | 5/1969 | Coakley et al. | 310/36 X |

Primary Examiner—G. Harris
Attorney—Wood, Herron & Evans

ABSTRACT: A device for adjusting the null current of a magnetically operated torque motor or force motor, preferably including a cylindrically shaped cap movably supporting a permanent magnet near the outside surface of the housing of the motor for angular adjustment about an axis substantially perpendicular to the axis of the armature.

PATENTED JUN22 1971

3,587,016

INVENTOR.
James L. Coakley
BY
Wood, Herron & Evans
ATTORNEYS

3,587,016

NULL ADJUSTER FOR MAGNETICALLY OPERATED TORQUE MOTORS

BACKGROUND OF THE INVENTION

This invention relates to torque motors and force motors and, more particularly, to a device for quickly, easily and accurately adjusting the null current, i.e., the current that produces no output torque or force while the armature is at its centered position. The purpose is to establish a nonzero null current or to maintain a given null current, normally zero, by counteracting or removing the adverse effects of environmental magnetic fields, temperature changes, and manufacturing irregularities.

Generally speaking, a torque motor is an electromagnetic transducer for producing a torque output on an armature proportioned or related to an electric current input. The output torque may be used to actuate and/or control various mechanisms. Torque motors are well known in industry and are widely employed, for example, to control hydraulic and pneumatic servovalves.

A force motor is generally similar to a torque motor, but produces a linear displacement and a force output on an armature proportioned or related to an electric current input. The invention is described hereinafter primarily in relation to torque motors, but is similarly useful in conjunction with force motors.

One common type of torque motor has an armature which is angularly displaceable, to a limited degree, in response to a current signal to the motor's control coils. The armature is mounted to a pivot, and it has end portions which are positioned in push-pull relation in air gaps defined between the armature and pole faces. The push-pull relationship is created by permanent magnets which generate magnetic flux across the gaps, this flux being commonly known as the polarizing flux.

The effect of the polarizing flux may be modified by a control flux produced by control coils in the motor when an electric signal is applied to them. Where, for example, the motor is of the type having two pairs of air gaps, the control flux increases the flux in one pair of air gaps and decreases it in the other pair; hence the armature is attracted to one pair of the poles and is repelled by the other pair, so that it is angularly displaced or turned in the gaps. Usually, such displacement of the armature from its centered position is opposed by a spring or other biasing means which tends to restore the armature to the centered position. Typically the armature is displaceable only over a small arc. The direction of armature rotation depends upon the polarity of the applied signal, and the torque on the armature varies with and may be proportional to the magnitude of the electrical input.

Because the use of torque motors is very often associated with control functions, such motors must be capable of performing with precision. However, their operation is dependent upon the polarizing flux generated by magnets, and partly because of this, construction of the motors in a manner which ensures that the armature will inherently have the proper null current has been found to be rather difficult. This difficulty primarily arises from problems of accurately reproducing and assembling the motor parts. Relatively minor structural differences in the manufacture and assembly of various component parts may cause unwanted dissymmetries that result in improper null current. Such variances, even though slight, tend to create individualistic operating variations for each torque motor, and each motor has had to be tediously and carefully balanced to remove these variations so that the motor will operate with its proper null current. Those skilled in the art will recognize that "nulling out" has traditionally been a long, slow and delicate final step in readying torque motors for use, but one which is absolutely critical.

Moreover, even if properly balanced when first assembled, the polarizing flux and, hence, the null current, may be changed by the environmental conditions under which the torque motor is operated. For example, if the torque motor is operated in close proximity to a ferromagnetic metal mass, for example, on a large cast-iron machine tool base, the external iron circuit may disturb the polarizing flux path in the motor to such an extent that a very sizeable change in null current may result. Also, changes in temperature of the operating environment may change the polarizing flux in the motor, thereby affecting the null current.

Until the present invention, this "nulling out" problem has been most effectively solved by the device disclosed in U.S. Pat. 3,435,393 of W. H. Meisel, Mar. 25, 1969. That device includes a loop of magnetically permeable material (i.e., soft magnetic material) angularly surrounding a magnetically operated torque motor, and a support mounting the loop for adjustably rotating the loop about an axis substantially perpendicular to the axis of the armature. However, the Meisel device, while providing a good ability for precisely correcting small errors in torque motor current null, does not have sufficient ability to correct relatively large errors in null current. Furthermore, the adapting of existing torque motors with the Meisel invention may involve removal of the existing housing, thus exposing the torque motor to dust and other contaminants which can adversely affect its operation.

SUMMARY OF THE INVENTION

The general objective of this invention is to provide a null adjuster for "tuning" the polarizing flux present in torque motors and force motors so that the null current may be accurately adjusted regardless of slight constructional inaccuracies, operating "drift," temperature changes, or of the ferromagnetic environment in which the motor operates.

One specific objective of the present invention is to provide such a null adjuster which is effective to correct even greater errors than has been previously possible. Another objective of the present invention is to provide a null adjuster which can be used with a torque motor or force motor without removing the conventional housing.

The present invention is predicated in part upon the concept of providing a magnet instead of merely a magnetically permeable material in the polarizing flux field of the motor. This invention is further predicated upon the concept of providing a null adjuster having a cap-shaped body adjustable around the outside of the existing housing of the motor. Specifically, these concepts are preferably embodied in a cylindrical cap having a permanent magnet mounted therein, which cap is slip fitted over the outside of the housing and adjustable in various angular positions.

The principle advantages of the present invention are the increased ability to perform large null adjustments and a simplified and more versatile structure which is adapted to be made without opening or replacing the existing housing of the motor.

DESCRIPTION OF THE DRAWINGS

Other objectives and advantages of the present invention will be more apparent to those skilled in the art from the following detailed description when taken in conjunction with the accompanying drawings in which.

Figure 1:
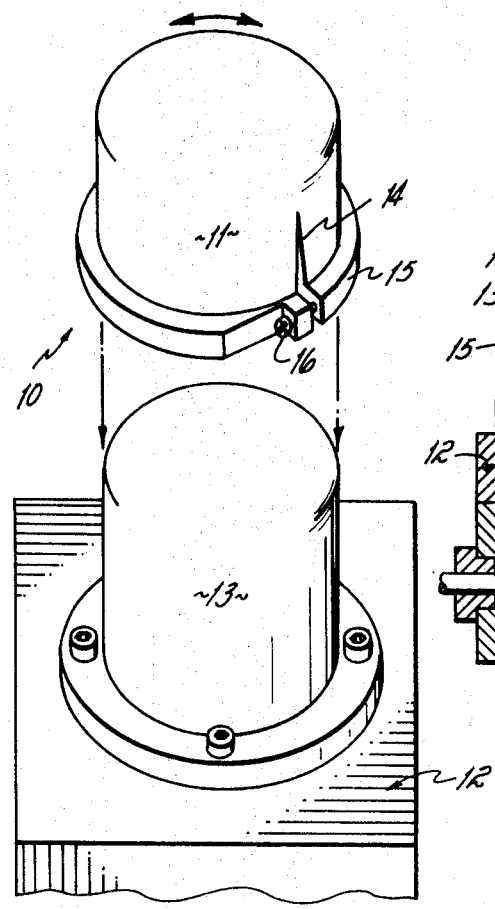
FIG. 1 is an exploded perspective view of a torque motor provided with a preferred form of a null adjuster in accordance with the present invention.

The preferred embodiment of the present invention is best illustrated by first referring to FIG. 1 in which a null adjuster 10 having a cap-shaped body 11 is combined with a torque motor encased in cylindrical housing 13 by slip fitting the cap 11 over the torque motor housing 13 without requiring the removal of the housing 13. A conventional device 12 is controlled by the torque motor. A null adjuster 10 is shown in the form of a cylindrical cap 11 closed at one end and having an inside diameter just slightly greater than the outside diameter of the housing 13. The cap 11, as so dimensioned, is adapted to slip fit over the housing 13 and to be rotatably movable thereon for angular adjustment. The cap 11 frictionally engages the housing 13 and is provided with a slit 14 in the side thereof and a flange 15 surrounding the open rim of the cap 11. The flange 15 is joined across the slit 14 by a threaded screw 16, the combination of the flange 15 and screw 16 thereby forming a clamp to secure the cap 11 to the housing 13 and to thereby hold the cap 11 in a selected angular position on the housing 13.

Figure 2:
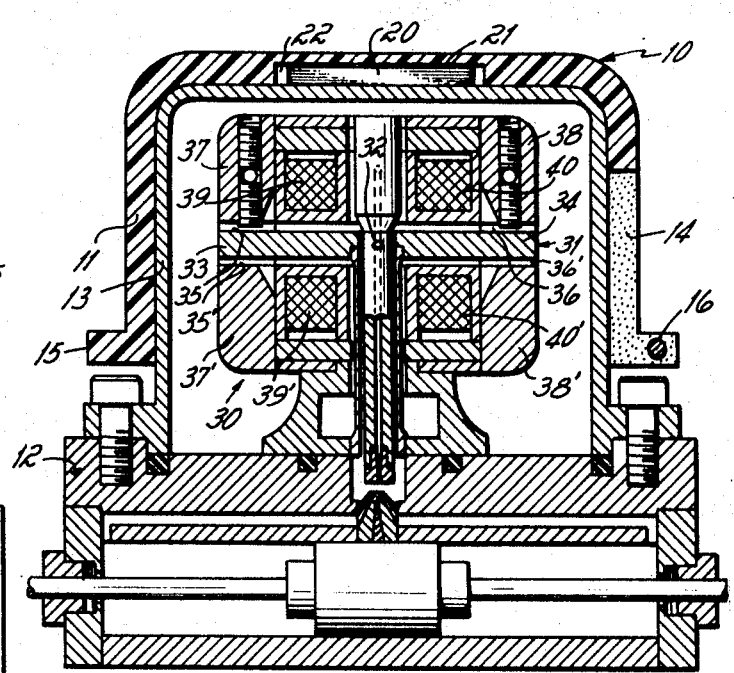
FIG. 2 is a cross-sectional view of a typical torque motor used to operate a hydraulic valve of the jetpipe type, provided with a null adjuster in accordance with the present invention.
Figure 3:
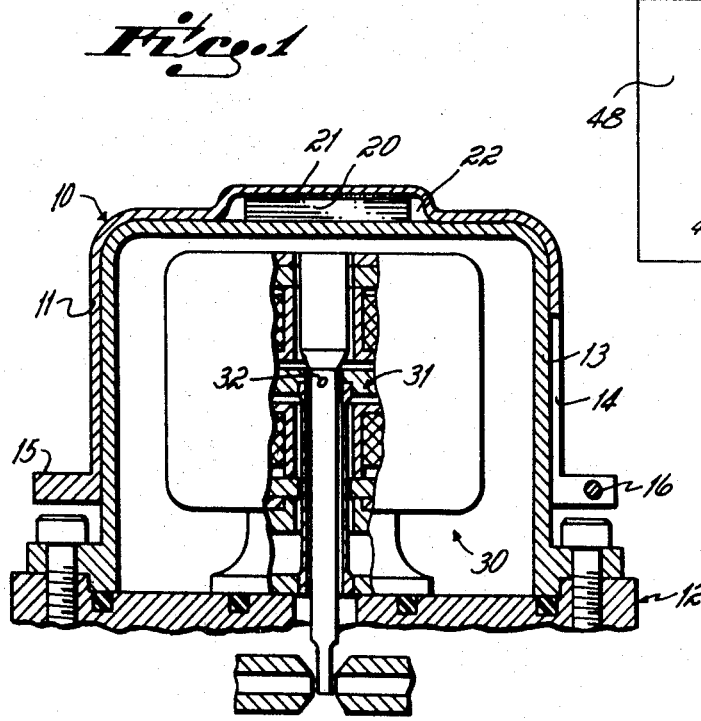
FIG. 3 is a partially cutaway view of another typical torque motor used to operate a hydraulic valve of the flapper type, provided with a null adjuster in accordance with a modified version of the invention.

Referring to FIGS. 2 and 3, which show two embodiments of the cap 11 on two types of controlled devices 12, a bar magnet 20 is shown mounted to the inside of the closed top portion of the cap 11. The magnet is secured by a suitable bonding material, for example, epoxy cement 21, in a small pocket 22 on the inside surface of the cap 11. The cap 11 is formed of a nonmagnetic material such as plastic or aluminum. In the embodiment illustrated in FIG. 2, for example, the cap is formed of a molded plastic and the pocket 22 is molded into the wall of the cap 11. Alternatively, the cap 11 illustrated in FIG. 3 is formed of deep-drawn nonmagnetic metal such as aluminum and the pocket 22 is formed of the drawn metal.

The devices controlled by the torque motor may be of any conventional type. Those shown and discussed by way of example are described in detail in the U.S. Pat. No. 2,962,611 of R. D. Atchley issued Nov. 29, 1960. The devices shown in FIGS. 2 and 3 correspond to those described in detail in connection with FIGS. 5 and 2, respectively, of the Atchley patent. Other examples of devices with which the null adjuster 10 can be used are disclosed in the U.S. Pat. No. 3,234,396 of Kubilos, dated Feb. 8, 1966 and in the Meisel patent referred to above.

Referring to FIG. 2, a torque motor 30 is briefly described to illustrate the interaction of the null adjuster 10. The torque motor 30 (shown at centered position) includes an armature 31 which is mounted to a pivot (not shown) at its center point 32. Air gaps are defined between the end portions 33 and 34 of the armature 31 and poles 37, 37', 38, 38'. Permanent magnets 48, 48', shown schematically in FIG. 4 but not shown in FIG. 2, generate a magnetic polarizing flux in poles, armature, and in these gaps. A control flux is generated in the control coils 39–39' and 40–40'. The gaps 35, 36' comprise one pair which function together, and the gaps 35', 36 comprise a second functional pair. The control flux increases the flux in one pair of the air gaps and decreases it in the other pair; hence the armature is attracted to one pair of the poles and is repelled by the other pair, so that it is angularly displaced or turned in the gaps. Such displacement of the armature from its centered position is opposed by a spring or other biasing means which tends to restore the armature to centered position; typically the armature is displaced only over a small arc by the control flux. The direction of armature rotation depends upon the polarity of the applied signal, and the torque on the armature varies with and may be proportional to the magnitude of the electrical input.

Figure 4:
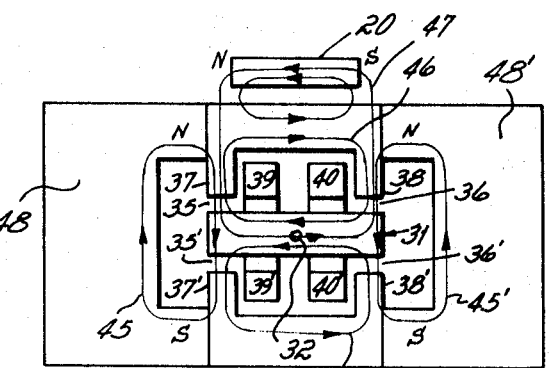
FIG. 4 is a diagram illustrating one manner in which the magnetic fluxes can interact to control null current in accordance with the present invention.

Referring to the diagram of FIG. 4, the polarization flux is illustrated by lines 45 and 45' and the control flux is illustrated by lines 46 and 46'.

The operation of the null adjuster 10 is best shown by reference to the diagram of FIG. 4, which shows the magnet 20 of the null adjuster 10 maintained in such close proximity to the outside of the housing 13 that its flux 47 contributes to the magnetic fields within the armature. In the case shown in FIG. 4, the null adjusting flux 47 of the magnet 20 is diagrammatically illustrated as contributing to the magnetic fields within the housing 13 in such a way as to support the polarizing flux 45 of the magnet 48 in gap 35 while opposing the polarizing flux 45' of the magnet 48' in gap 36. Thus, the armature is urged to move in a counterclockwise direction in FIG. 4. By a rotation of the magnet 20 on the housing 13, the effect of the flux 47 of magnet 20 changes and the null adjusting torque which is exerted on the armature 31 varies in magnitude or sign or both. Reversing the magnet 20 by rotating the cap 11 through 180° on the housing 13 will reverse the direction of the torque on the armature 31. When the cap 11 is rotated to various intermediate orientations, the null adjusting torque will be of some different magnitude in one direction or the other, there existing two intermediate and approximately diametrically opposite points or angular positions in which no null adjusting torque is exerted on the armature 31 about the pivot point 32.

Where the surfaces of the housing 13 and cap 11 are cylindrical, such continuous rotary adjustment is possible. However, where continuous angular position is not possible, the null adjuster according to the present invention can be continuously adjusted about discrete angular positions by varying the vertical position of the cap 11 on the housing 13. Such vertical variations result in a decrease in the magnetic flux 47 furnished by the magnet 20 as the distance of the magnet 20 above the torque motor 30 increases.

By use of an appropriately shaped and dimensioned cap, the null adjuster 10 can be applied to a wide range of torque motors, thereby to provide a null adjusting capability for them. In this connection it is apparent that the existing housing of a torque motor need not be removed or even loosened; the cap 11 can merely be slipped over it, adjusted to give the desired null adjusting effect, and then tightened in place at such position.

What I claim is:
1. In combination:
   a. a motor for producing a motive output on a movable armature enclosed within a surrounding housing, said armature forming air gaps in conjunction with pole faces, the motive output on said armature being variable in response to a change in magnetic flux across said air gaps, said motor also having electromagnetic means for changing the flux across said gaps in accordance with an input current; and
   b. adjusting means external to said housing for magnetically changing the null current, said adjusting means comprising:
      a supporting body engaging at least a part of the outer surface of said housing,
      said body being adjustably movable on said housing,
      means for securing said body with respect to said housing,
      a magnet mounted to said body,
      said magnet magnetically interacting with said motor to change the null current of said motor when said body is moved on said housing.
2. The combination of claim 1 wherein said means for securing the body on said housing comprises a clamp.
3. The combination of claim 1 wherein said housing and body are right cylinders and said body frictionally engages the outside surface of said housing, and is rotatable around said housing.
4. The combination of claim 1 wherein said magnet is a permanent magnet.
5. The combination of claim 4 wherein said permanent magnet is secured to said body and is oriented along a line perpendicular to a line perpendicular to the shaft of said motor.
6. A null adjuster for use with a motor which produces a motive output on an internal movable armature and having an outer housing, said armature forming air gaps in conjunction with pole faces, the motive output on said armature being variable in response to a change in magnetic flux across said air gaps, said null adjuster comprising:
   a cap-shaped nonmagnetic body portion;
   a permanent magnet mounted to said body portion; and means for clamping said body portion in desired position on the housing of such a motor when said null adjuster is placed on the motor housing.

7. The null adjuster of claim 6 for use with a motor having a cylindrically shaped outer housing, wherein said body portion is cylindrically shaped and has an inside surface of slightly greater diameter than the outside surface of the housing of such a motor, whereby said null adjuster can be clamped in desired angular position on the housing of the motor.